E. Cowles,
Candle Mold.
No. 86,059. Patented Jan. 19, 1869.
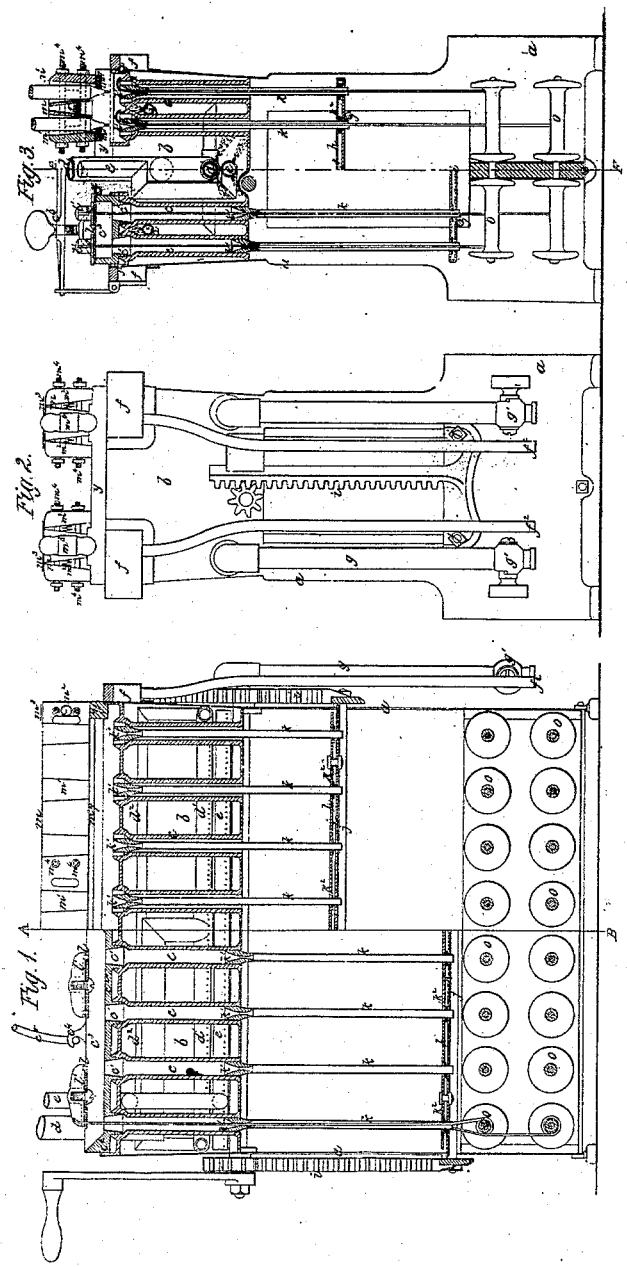
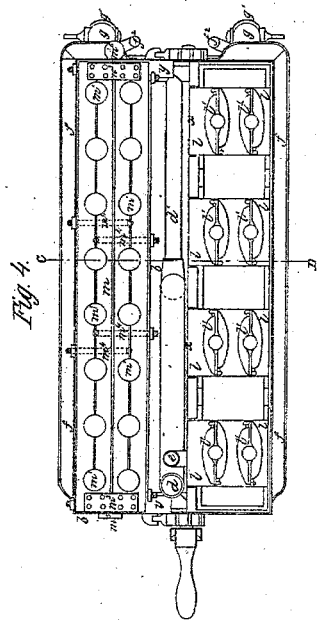
Witnesses,
Frank Trigg
John Bulkley
Inventor.
E. Cowles
By his Atty
H. Howson

United States Patent Office.

EDWARD COWLES, OF HOUNSLOW, KINGDOM OF GREAT BRITAIN AND IRELAND.

Letters Patent No. 86,059, dated January 19, 1869.

IMPROVED MACHINE FOR MAKING CANDLES.

The Schedule referred to in these Letters Patent and making part of the same.

*To all whom it may concern:*

Be it known that I, EDWARD COWLES, of Hounslow, in the county of Middlesex, Kingdom of Great Britain and Ireland, machinist, have invented a new and useful Improved Machine for Making Candles; and I do hereby declare the following to be a full, clear, and exact description of the same, reference being had to the accompanying drawing, and to the figures and letters marked thereon.

The objects of this invention are to produce candles, whose largest diameters are at some point between the upper and lower extremities of their main bodies or shafts; to centre the wicks in the moulds more conveniently; and to regulate the temperature of the moulds throughout, more uniformly and evenly than heretofore.

The machine is peculiarly adapted for making candles with tapering ends, to fit various sizes of candlesticks, without cutting, as described in the Letters Patent of J. L. Field, January 31, 1865, the means for regulating the temperature of the moulds being likewise specially advantageous in the manufacture of paraffine, stearine, sperm, or composition-candles, whether of the forms above mentioned or otherwise.

For these purposes the moulds are made in separate parts, joining together horizontally at the point of largest diameter of the candle, the wicks being centred by slotted plates, provided with slotted buttons or catches, capable of partial rotation upon their axes, for holding the ends of the wicks, which, by this means, are centred as readily and equally well for the first as for any subsequent moulding.

The moulds are placed in a trough or vessel containing water, the temperature of which is raised or lowered, as circumstances require, by the admission of steam or water in divided streams through perforated pipes arranged to project the steam or water toward the upper and lower portions of the moulds, as hereinafter described, the overflow being carried off uniformly, from various parts of the main trough containing the moulds, by smaller troughs or channels, or equivalent devices, communicating by suitable openings or apertures with the upper portion of the main trough.

In order to enable others skilled in the art to make and use my invention, I will proceed to more particularly describe the same, with reference to the accompanying sheet of drawings, in which—

Figure 1 represents a longitudinal vertical section of the machine, arranged, in this case, to make self-fitting candles, having enlarged tapering lower ends;

Figure 2 is an end view;

Figure 3, a sectional view; and

Figure 4, a plan view.

$a$ is the frame or stand.

$b$, the main trough or water-box, in which the candle-moulds are set.

$c$ are the pipes or tubes for moulding the shafts of the candles, and are firmly fixed to a top and bottom plate, as shown.

$c^1$ are the continuations of the moulds for forming the enlarged tapering lower ends of the candles.

These continuations are arranged in double rows, and formed in the block of metal $c^2$, the upper part, $c^3$, of which constitutes a trough or receptacle for receiving the melted material, and feeding it to the moulds. Its sides are formed with hooks $c^4$ to receive the shackles $c^5$, attached to a cord or chain passing over a pulley above, for raising the block $c^2$, with its mould $c^1$, from the pipes or tubes $c$.

$c^6$ are cramps for holding down the blocks $c^2$ during the process of casting the candles.

$d$ is the "three-pipe inlet," through which water enters the main trough or water-box. It has a branch-pipe, $d^1$, perforated to direct the entering liquid in jets toward the bottoms of the moulds; also two upper branches, $d^2$, perforated, to direct jets of water against the centre portions of the pieces of metal $c^2$, between the continuations $c^1$ of the moulds.

$e$ is the pipe for supplying steam, to raise the temperature of the moulds, by warming the water in the main trough. It is perforated so as to direct jets of steam toward the spaces between the lower ends or tip parts of the moulds, and care should be taken that these jets do not strike the pipes.

In some cases, the steam-pipe $e$ may be dispensed with, and the temperature of the moulds raised, by admitting warm water through the "three-pipe inlet" $d$.

$f$ are the small troughs or channels, communicating, by apertures $f^1$, with the main trough or water-box, for carrying off the overflow.

$f^2$ are waste-pipes from the overflow-channels $f$.

$g$, pipes for drawing water evenly from both sides of the main trough, and $g^1$, taps or cocks to same.

$h$ is a platform, moved up and down by the gear operating upon the racks $i$, attached, on the outside of the frame $a$, to each end of the platform, and connected together by rods $j$. This platform consists of a double floor, with a space, $i^1$, between.

$k$ are hollow rods, carrying at their upper ends the candle-tip moulds $k^1$. The lower ends pass easily through their respective holes in both floors of the platform $h$, but this action is limited by nuts or projections $k^2$, fastened to them between the floors.

The pipes or tubes $c$ are made slightly tapering, so that the movable tips $k^1$, when on the shoulder made in the board or plate that supports the lower end of the tube, may form a tight joint, and thus prevent the melted material from leaking through, for which reason, also, the wick should snugly fit the opening in the tip.

$l$ are the slotted plates, hinged at $x$ to the sides of the troughs or receptacles $c^3$, and which are provided with slotted buttons or catches $l^1$, each capable of partial rotation upon its axis, for centring and holding the ends of the wicks.

The slotted plates may each be provided with an eye, through which is threaded a pin or wire, running the entire length of the block $c^2$, so that the whole of the slotted plates in each row may be raised or turned on their hinges simultaneously.

$m$ is the clamp, constructed of four longitudinal pieces, made with segmental circular recesses $m^1$, forming circular holes, kept open by the spiral springs $m^2$, which cause the lower parts of the orifices to expand more than their upper portions, the latter being confined by the hinges $m^3$, so that more room is given for the entrance of the candles, which are pushed up through the openings, and retained therein, as hereinafter described.

$m^4$, set-screws, confining and adjusting the sections, so as to regulate the size of the holes.

$m^5$ is a flat bar, provided with a handle, $m^6$, for contracting the lower parts of the openings.

$m^7$ are strips of India rubber, fastened to the under side of the clamp, to assist in holding the candles, and to prevent bruising.

When the handle $m^6$ is turned, so as to bring the edges of the bar $m^5$ against the sides of the two inner sections of the clamp, the latter are pushed toward the two outer sections, and thus render the holes smaller at their lower ends than at the top, which contraction, aided by the strips $m^7$, will retain the candles when left in the clamp.

$o$ are the spools, upon which the wicks are wound.

The machine may be constructed with a greater or less number of moulds, as circumstances require.

The mode of operation is as follows:

The wicks are first drawn through the rods from the spools below the platform, and to the top of the candle-moulds, so that their ends lie on the bottom of the receptacle $c^3$.

The slotted plates are then shut down, and the buttons or catches having been turned, so that their slots are opposite to the slots in the plates, the ends of the wicks are then drawn up into the slots, after which the buttons are turned slightly, so as to tighten the ends of the wicks between themselves and the plates.

Steam or hot water is then let into the trough $b$, through the perforations along the sides of the pipe $e$, and when the moulds are sufficiently warmed, the melted stuff is poured into the receptacle $c^3$, from whence it runs into and fills the moulds. Cold water is then introduced, by the pipe $d$, through the perforations along its branch $d^1$, which direct the water in jets toward the bottoms of the moulds, and through the perforations in the branches $d^2$, which simultaneously direct their jets toward the block $c^2$, for cooling the upper parts or continuations $c^1$ of the moulds, thus cooling the candles uniformly throughout. The surplus water flows through the apertures $f^1$ into the small troughs or channels $f$, and passes away down the waste-pipes $f^2$.

When the candles are sufficiently cool to be withdrawn from the mould, the buttons or catches are turned slightly, so as to release the ends of the wicks. The slotted plates are then raised upon their hinges, so that a sharp scraper may be introduced into the receptacle $c^3$, so as to remove the projecting wicks and surplus material from the bottoms of the candles, after which the cramps are unfastened, and the block $c^2$ raised up by the shackles, leaving the candles tip downwards in, and with their bottom ends projecting above the tops of the pipes or tubes $c$.

Blocks $y$ are then placed across the ends of the upper tube-plates for receiving the open clamps, the holes in which come just over the ends of the candles. Power is then applied to raise the platform, and the rods are forced up, pushing the candles before them.

When the rods have pushed the candles through the orifices in the clamps, until the tips of the candles are elevated above the strips $m^7$, the handle $m^6$ is turned, so as to bring the edges of the bar $m^5$ against the sides of the two inner sections of the clamp, by which the latter are pushed toward the two outer sections, so as to hold the candles. The wicks are then cut, the clamps with their contents removed, the blocks $c^2$ again placed in position, the wicks centred, as before, and the platform lowered, ready to mould a fresh lot of candles.

I am aware that it is not new to enclose the moulding-pipes or tubes within a tight chamber upon a frame, so that, at pleasure, water can be admitted to chill the tubes, or steam to heat them, but I believe it has never before been proposed to admit the water and steam in divided streams, so as to diffuse it evenly, and to regulate the temperature uniformly throughout, as hereinbefore described.

I am also aware that movable mould-tips have been mounted upon hollow rods, so that simultaneously, by suitable devices, each can be moved perpendicularly up through the entire tube, pushing the candle up before it into an adjustable clamp, capable of being contracted, so as to hold and support the candles in an upright position, whereby they are made to centre and hold the wicks in position for the next set of candles; therefore, I make no claim to the arrangements in question; but What I believe to be new, and desire to secure by Letters Patent, is—

1. Constructing the moulds in separate parts, $c$ and $c^1$, substantially as described, for making candles, having their largest diameters at some point between the upper and lower extremities of their main bodies.

2. The slotted plates and buttons, or catches, for centring and holding the wicks, substantially as described.

3. In combination, with the trough $b$, the means described for regulating the temperature of the moulds uniformly, by admitting water and steam, or water only, in divided streams, through apertures, arranged so as to disperse it within the main trough, or water-box, as herein set forth.

4. The means for carrying off surplus water evenly from the upper portion of the main trough, by other troughs or channels, or equivalent devices, the whole arranged and operating substantially as described.

In testimony whereof, I have signed my name to this specification, in the presence of two subscribing witnesses.

EDWARD COWLES.

Witnesses:
 W. LLOYD WISE,
  *Patent Agent, Adelphi, London.*
 F. W. ATKINSON, *Clerk,*
  *Consulate of the United States, London.*